United States Patent [19]

Otterbein

[11] Patent Number: 4,544,513
[45] Date of Patent: Oct. 1, 1985

[54] COMBINATION DIRECT AND INDIRECT EVAPORATIVE MEDIA

[75] Inventor: Roy T. Otterbein, Phoenix, Ariz.

[73] Assignee: Arvin Industries, Inc., Columbus, Ind.

[21] Appl. No.: 632,246

[22] Filed: Jul. 19, 1984

Related U.S. Application Data

[63] Continuation-in-part of Ser. No. 485,200, Apr. 15, 1983, Pat. No. 4,461,733, which is a continuation-in-part of Ser. No. 479,127, Mar. 28, 1983.

[51] Int. Cl.⁴ ............................................. B01F 3/04
[52] U.S. Cl. .................................. 261/153; 261/159; 165/166
[58] Field of Search ................... 261/153, 158, 159; 165/166

[56] References Cited

U.S. PATENT DOCUMENTS

| | | | |
|---|---|---|---|
| Re. 17,998 | 3/1931 | Fleisher . | |
| 1,986,529 | 1/1935 | Ray . | |
| 2,044,352 | 6/1936 | Evans | 62/6 |
| 2,174,060 | 9/1939 | Niehart | 261/11 |
| 2,321,110 | 6/1943 | Shipman | 257/245 |
| 2,596,642 | 5/1952 | Boestad | 257/245 |
| 2,697,588 | 12/1954 | Jensen | 257/245 |
| 2,784,571 | 3/1957 | Schelp | 62/138 |
| 2,825,210 | 3/1958 | Carr | 62/139 |
| 3,025,685 | 3/1962 | Whitlow | 62/63 |
| 3,286,999 | 11/1966 | Takeda | 261/30 |
| 3,395,903 | 8/1968 | Norback et al. | 261/112 |
| 3,450,393 | 6/1969 | Munters | 261/112 |
| 3,476,179 | 11/1969 | Meister et al. | 165/166 |
| 3,500,615 | 3/1970 | Meek | 55/233 |
| 3,683,591 | 8/1972 | Glav | 55/34 |
| 3,733,063 | 5/1973 | Loetel et al. | 261/112 |
| 3,757,855 | 9/1973 | Kun et al. | 165/166 |
| 3,792,841 | 2/1974 | Munters | 261/112 |
| 3,880,231 | 4/1975 | Gauthier | 165/166 |
| 3,963,810 | 6/1976 | Holmberg et al. | 261/112 |
| 3,994,999 | 11/1976 | Phelps | 261/159 |
| 3,995,689 | 12/1976 | Cates | 165/166 |
| 4,002,040 | 1/1977 | Munters et al. | 62/121 |
| 4,023,949 | 5/1977 | Schlom et al. | 62/309 |
| 4,043,388 | 8/1977 | Zebuhr | 165/166 |
| 4,156,351 | 5/1979 | Schlom et al. | 62/121 |
| 4,246,962 | 1/1981 | Norback | 165/166 |
| 4,263,967 | 4/1981 | McNab et al. | 165/166 |
| 4,272,462 | 6/1981 | Butt | 261/153 |
| 4,296,050 | 10/1981 | Meier | 261/112 |
| 4,361,426 | 11/1982 | Carter et al. | 55/257 |
| 4,361,525 | 11/1982 | Leyland | 261/152 |
| 4,372,897 | 2/1983 | Sanderson et al. | 261/153 |
| 4,460,388 | 7/1984 | Fukami et al. | 165/166 |

FOREIGN PATENT DOCUMENTS

| | | | |
|---|---|---|---|
| 2502303 | 8/1975 | Fed. Rep. of Germany . | |
| 2459437 | 1/1981 | France | 261/153 |
| 1226259 | 3/1971 | United Kingdom . | |
| 463840 | 6/1975 | U.S.S.R. . | |
| 641260 | 1/1979 | U.S.S.R. | 261/153 |

OTHER PUBLICATIONS

J. D. Pescod, Unit Air Cooler Using Plastic Heat Exchanger with Evaporatively Cooled Plates, Australian Refrigeration, Air Conditioning and Heating, Sep. 1968, pp. 22–26.

Primary Examiner—Tim Miles
Attorney, Agent, or Firm—Barnes & Thornburg

[57] ABSTRACT

A combined direct and indirect media is disclosed which is formed from a plurality of plate-like structures. The plates are generally sheet-like elements having an indirect portion and a direct portion. The indirect portion includes a first indirect section, a second indirect section, and a hinge disposed between the first and second indirect sections. The first indirect section can be folded about the hinge to place the first and second sections in an opposed relation. The direct and indirect portions are configured to form the direct and indirect evaporative cooling media when a plurality of plates are arranged in an ordered array.

23 Claims, 16 Drawing Figures

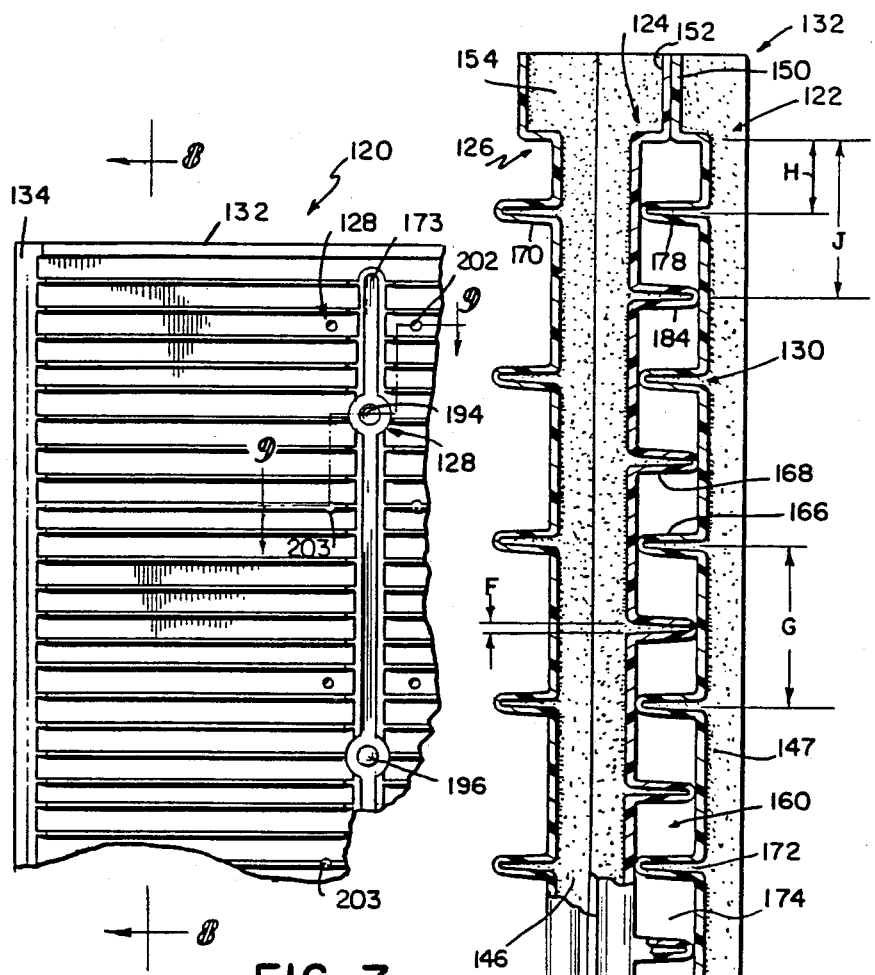
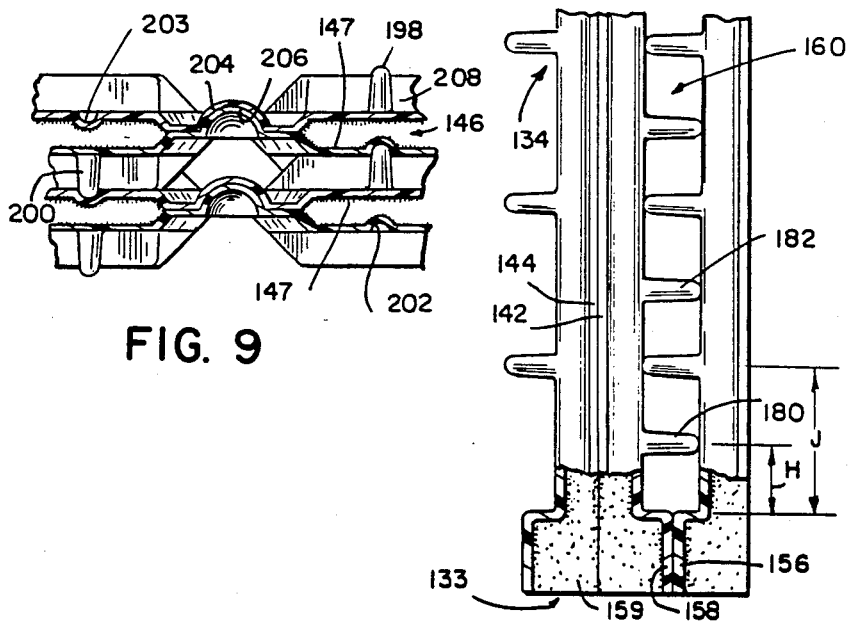

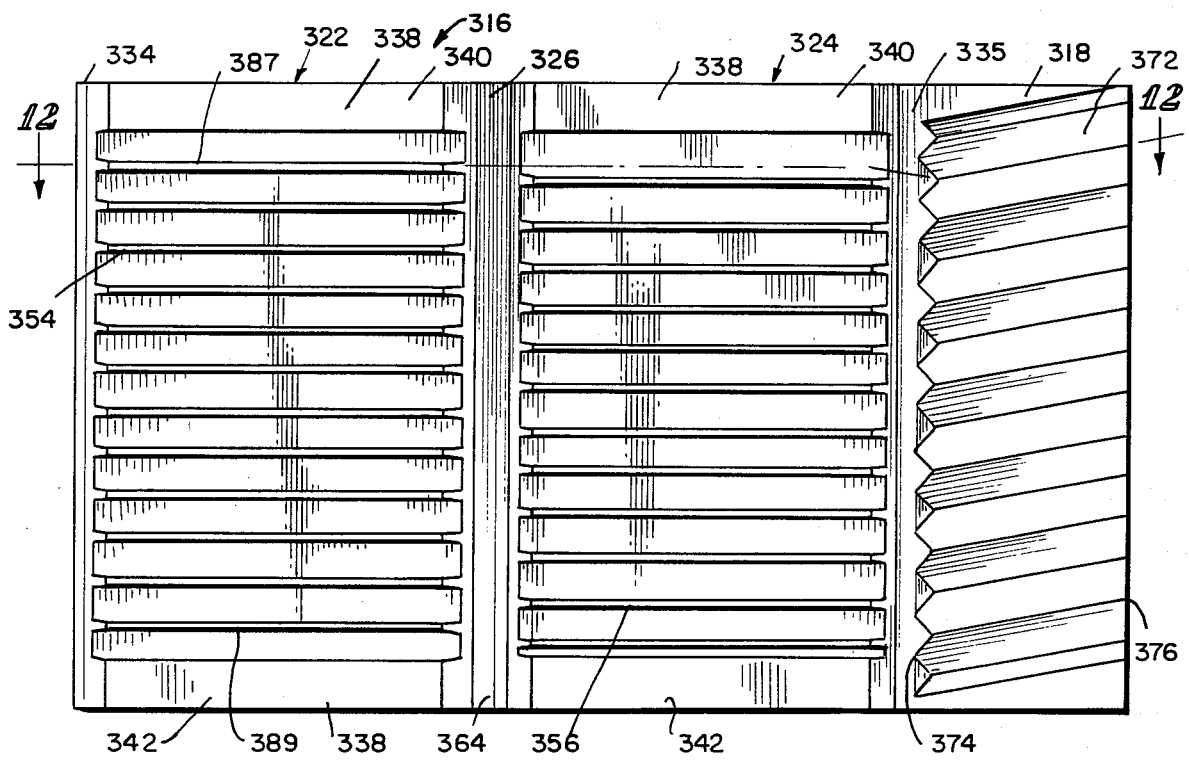
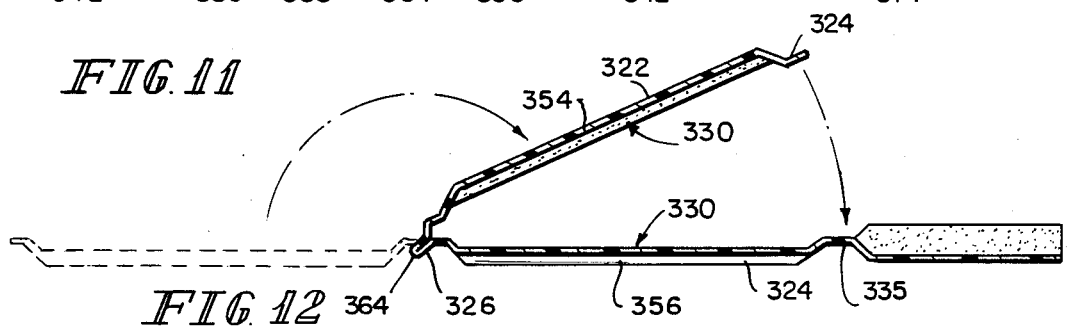
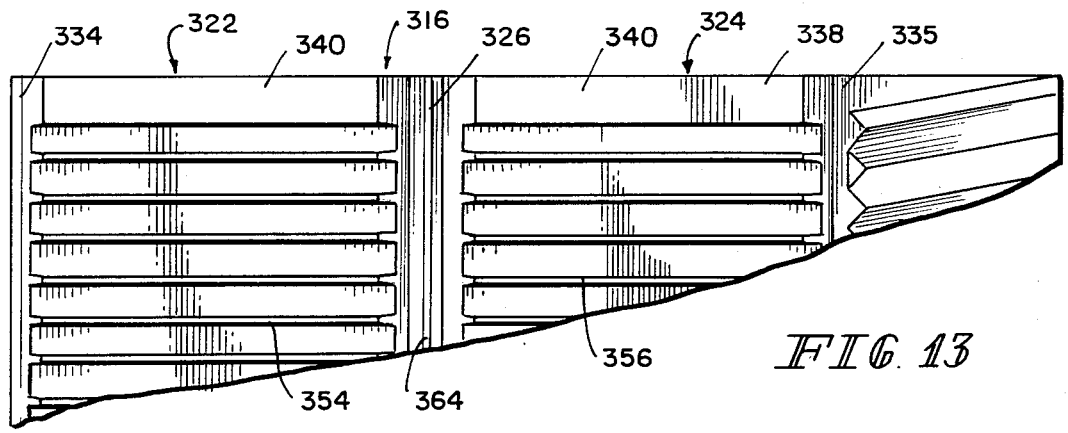

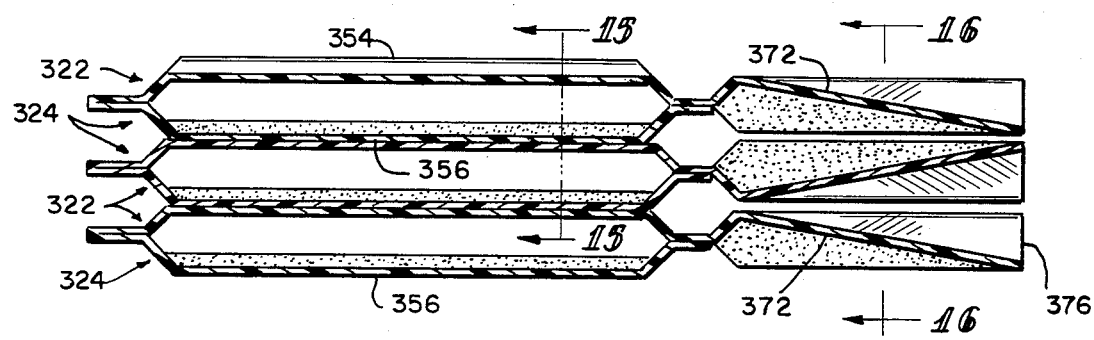
FIG. 14
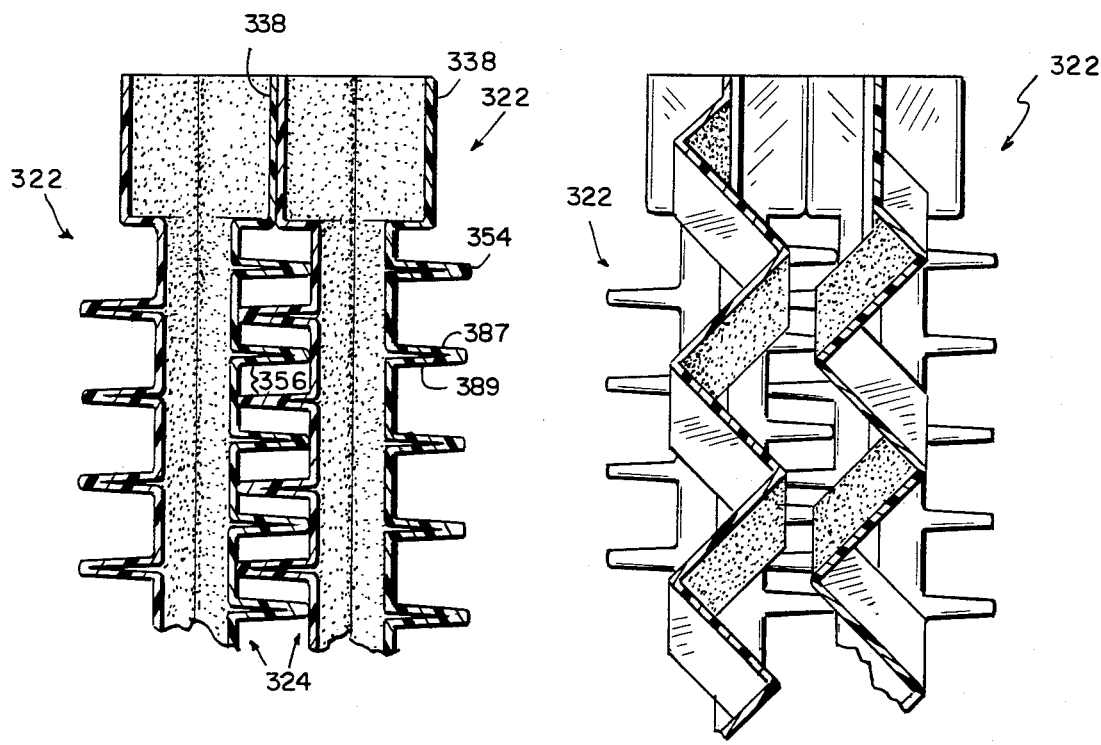
FIG. 15
FIG. 16

COMBINATION DIRECT AND INDIRECT EVAPORATIVE MEDIA

This is a continuation-in-part of U.S. patent application Ser. No. 485,200, filed Apr. 15, 1983, now U.S. Pat. No. 4,461,733, which in turn is a continuation-in-part of U.S. patent application Ser. No. 479,127, filed Mar. 28, 1983.

This invention relates generally to evaporative air coolers having an integral indirect evaporative cooling stage, and more particularly to a combined direct and indirect evaporative cooling media for such evaporative air coolers.

The principles upon which indirect evaporative coolers utilizing a wetted surface air-to-air heat exchanger operate are well known. A stream of water, preferably in sheet form, trickles down through a first (wet side) channel. A current of air is blown in the same channel typically in the opposite direction of the flow of water to partially evaporate the water. As the air evaporates the water, the temperature of the unevaporated water which remains in the channel decreases. The temperature decrease of the unevaporated water in turn cools the material which defines the channel through which the water is moving. This channel is an element of the heat exchanger media, and typically consists of some sort of tube or other channel-defining structure.

A second (dry side) channel stream of air is blown or drawn across the opposite surface of the channel-defining structure. This second stream of air is kept separate from the air and water in the first channel. The channel-defining heat exchanger media which has been cooled as described above in turn cools this second stream of air. This cooled air can then be circulated directly into a space to be cooled or circulated through a direct evaporative cooler for further cooling before circulation into the space to be cooled.

In a direct evaporative cooler, the air to be cooled (dry side air) contacts water which is supplied to a direct evaporative cooling media. The contact with the water further cools the air, which can then be circulated into the space to be cooled.

Many attempts have been made to create improvements in indirect evaporative cooling media. For example, U.S. Pat. No. 4,263,967 discloses a heat exchanger comprising a plurality of parallel plastic plates. The plates include a regular pattern of conical projections extending from one side of each sheet which acts to space each sheet from the adjacent sheet. Edges of each sheet are folded to form return flanges which engage edges of an adjacent sheet to form a channel for containing the flow of air and other fluids.

The transfer of heat through plastic sheets is generally limited by the poor heat conduction characteristics of most plastics. The effective heat transfer area of each media plate in the prior art is generally limited to the product of the exterior dimensions of each plate.

Many attempts have also been made to create improvements in direct evaporative coolers. For example, Carter et al U.S. Pat. No. 4,361,426 relates to a fill for use in water cooling towers, such as force-draft cross-flow cooling towers. This fill includes a primary fill sheet which directs water flow in a downward, helical spiral pattern of multiple-groove channels to increase air and water contact time. A vertically oriented deep corrugated drift eliminator can be intergrally connected with the primary fill sheet. Munters U.S. Pat. No. 3,792,841 relates to a liquid and gas contact apparatus which includes a contact body composed of first and second sets of corrugated sheets. The sheets of the first set are disposed in an alternating arrangement with the sheets of the second set. See also, C. G. Munters U.S. Pat. No. 3,450,393 and P. G. Norback et al U.S. Pat. No. 3,395,903.

Although direct cooling media and indirect cooling media are disclosed in the above-mentioned patents, none disclose a practical evaporative cooling plate having both direct and indirect portions for forming a combined direct and indirect evaporative cooling media. One object of the present invention is to provide such a plate.

In accordance with the present invention, a plate is provided for use in a combined indirect and direct media. The plate comprises a generally sheet-like element having an indirect portion and a direct portion. The indirect and direct portions are configured to form a combined direct and indirect evaporative cooling media when a plurality of plates are arranged in an ordered array.

Also in accordance with the present invention, an evaporative cooling media is disclosed which comprises a plurality of plates. Each plate is formed with a direct portion and an indirect portion. The plates are positionable adjacent to each other in an ordered array such that the direct and indirect portions are co-aligned to form a combined direct and indirect evaporative cooling media.

One aspect of the present invention is that both an indirect and a direct cooling media are combined into one media element. This has the advantage of enabling a manufacturer to make a two-stage (direct/indirect) evaporative cooler from a single element, thus obviating the need for two separate elements.

Another aspect of the present invention is that the plates can be formed to each include a first and second indirect section, with the sections being connected by hinge means integrally formed as a part of the plate. This aspect has the advantage of enabling a manufacturer to form a two-stage evaporative cooler using a single set of plates. Additionally, when the first indirect section is folded about the hinge to place the first and second sections in an opposed relation, the hinge means serves as a leading edge for air flowing through the dry channel. This leading edge helps to direct incoming air into the dry side channels and helps to maintain the dry side channel air separate from the wet side channel air.

One feature of the instant invention is that capillary fins can be used which extend into the second (dry side) channel from the plate upon which they are formed substantially to an adjoining plate. This feature has the advantage of enabling the fins to serve as spacers to maintain adjoining plates in a spaced relation. This feature also has the advantage of enabling the manufacturer to use plates which are thinner than those previously used. By using thinner plates, less material is required to make the plates, which reduces the material cost of the heat exchanger. Further, the use of thinner plates improves the heat conduction from the first channels to the second channels. This results in a greater cooling capacity for the heat exchanger. The present arrangement also results in the plates having a greater surface area, which also enhances the performance of the heat exchanger.

Another feature of the instant invention is that the capillary fins are placed in an alternating arrangement with the fins of adjoining plates. This feature has the advantage of making adjoining plates easier to align with respect to each other. In one embodiment, plates are formed which have their first fins at a distance from the edge of the plates which differs from the distance their last fins are placed from the opposite edge of the plate, thereby obviating the need for forming plates having different fin placements. This fin placement can be achieved by forming plates having top flanges and bottom flanges, with the top flanges having a different vertical height than the bottom flanges. Plates having the same fin arrangement can be used by placing adjoining plates in a head-to-tail relation. This arrangement prevents the manufacturer from incurring tooling costs associated with forming two different molds to form the plates. These and other features of this invention and their inherent advantages will become apparent to those skilled in the art from the following description of preferred embodiments and the accompanying drawings illustrating the best mode of carrying out the invention as presently conceived wherein:

FIG. 7 is a front elevational view of a media sheet of another embodiment of the present invention;

FIG. 8 is an enlarged, cross-sectional view taken along lines 8—8 of FIG. 7;

FIG. 9 is an enlarged, cross-sectional view taken along lines 9—9 of FIG. 7;

FIG. 11 is a side elevational view of a media plate of the combined direct/indirect cooling media;

FIG. 12 is a cross-sectional view taken along lines 12—12 of FIG. 11;

FIG. 13 is a side elevational view of another embodiment of a media plate of the combined direct/indirect evaporative cooling media, FIG. 14 is a cross-sectional view taken along lines 14—14 of FIG. 10;

FIG. 15 is a cross-sectional view taken along lines 15—15 of FIG. 14; and

FIG. 16 is a cross-sectional view taken along lines 16—16 of FIG. 14.

Figure 1:
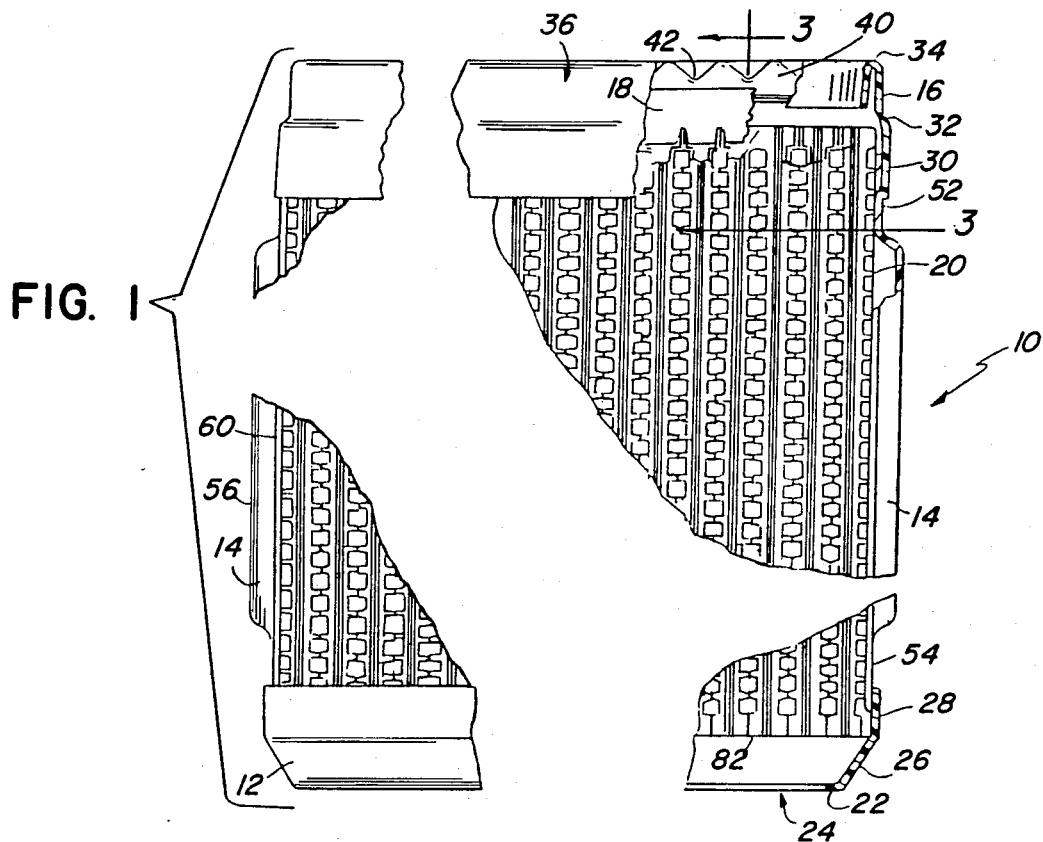
FIG. 1 is a side elevation view, partially broken away, of a wetted surface air-to-air heat exchanger constructed in accordance with the present invention.

A wetted surface air-to-air heat exchanger 10 constructed in accordance with the present invention comprises generally a lower collar 12, end plates 14, and an upper collar 16. Water is caused to trickle downward over water distribution skirts 18 into and through a first set of channels in the media 20, while a first flow of air is caused to flow upward through the same channels to partially evaporate the water, thereby cooling the media. A second flow of air is caused to flow through the media 20 in a direction substantially normal to the plane of FIG. 1 to be cooled by contact with the media.

The lower collar 12 as shown in FIG. 1 comprises a generally rectangular annular element having a substantially horizontal inwardly protruding lip 22 which terminates to define bottom opening 24 of the exchanger 10. An upwardly and outwardly inclined portion 26 extends between lip portion 22 and a substantially vertically projecting rim portion 28 which envelopes the lower extremities of end plates 14 and media 20.

Figure 2:
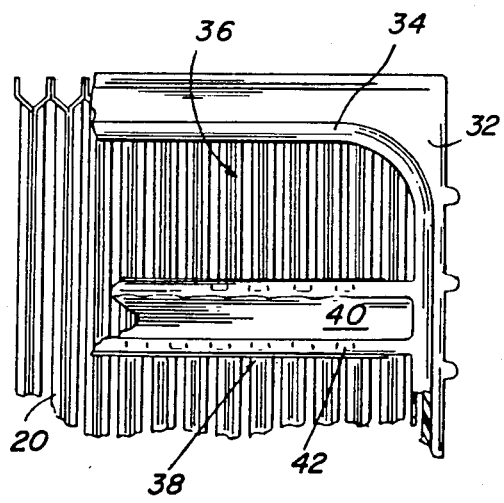
FIG. 2 is a top plan view, partially broken away, of the heat exchanger shown in FIG. 1.
Figure 3:
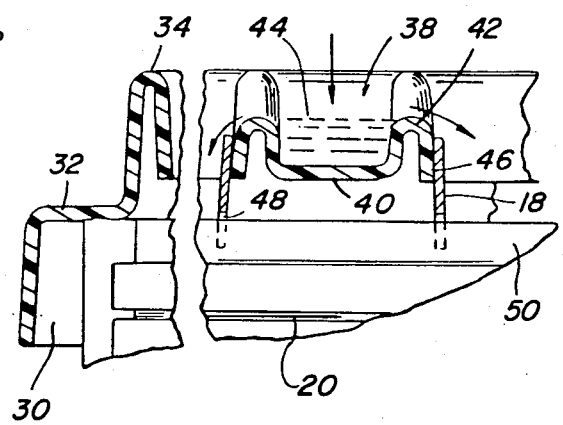
FIG. 3 is a sectional view taken along lines 3—3 of FIG. 1.

The upper collar 16 shown in detail in FIGS. 1–3 includes a downwardly extending rim portion 30 which envelopes the end plates 14 and media 20 in a manner similar to rim portion 28 of lower collar 12. The upper collar 16 extends upwardly from the rim portion 30 to an inwardly extending step 32 which rests upon the top edge of media 20. From step 32, the upper collar extends upwardly to a perimeter-defining ridge 34 which defines the perimeter of top opening 36 of exchanger 10.

The upper collar integrally includes water distribution means 38 comprising at least one upwardly opening channel 40 including tooth-like depressions 42 on the edge of the channel 40 which direct water 44 from the channel 40 outward on either side thereof and downward to media 20. Lower outer portions of the channels 40 include water distribution skirts 18 which can be integrally formed with the channel 40 or secured to the channel 40 by a securing means 46 such as an adhesive or weld. The water distribution skirts 18 can include on a lower edge thereof slits or serrations 48 for receiving upper edges 50 of media 20.

Each end plate 14 includes a top flange 52 and a bottom flange 54 which are held within the upper collar 16 and lower collar 12, respectively. Between the top flange 52 and bottom flange 54, the end plates 14 bow outwardly from the exchanger 10 to form a substantially planar vertical outer surface 56 which can be interrupted by one or more vertically extending depressions (not shown) for strengthening and rigidifying the end plate 14. Side flanges 60 are included which define the vertical edges of the exchanger 10.

Figure 4:
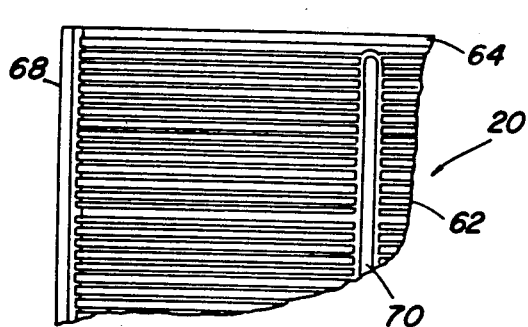
FIG. 4 is a front elevation view of a media sheet of the present invention.
Figure 6:
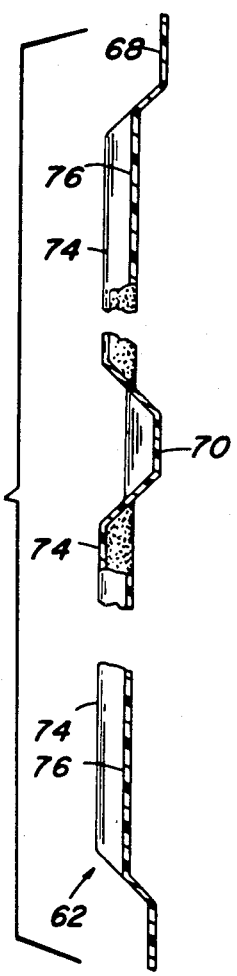
FIG. 6 is a top plan view of a media plate as viewed from line 6—6 of FIG. 5, partially broken away.
Figure 5:
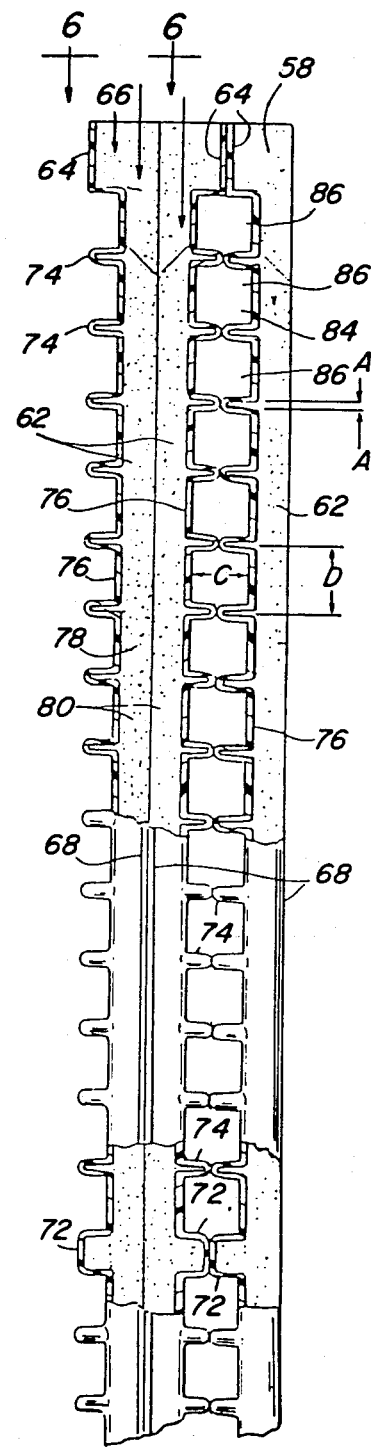
FIG. 5 is an enlarged view, broken away, of the media plate assembly used in FIG. 1.

The media 20 is shown in detail in FIGS. 4–6 to comprise a plurality of plates 62 of water-impervious material which are arranged in opposed pairs as shown in FIG. 5. Each plate 62 includes an upper flange 64 adapted to be secured to a similar upper flange of an adjacent plate 62 as shown at the top of FIG. 5. The space between non-contacting adjacent flanges 64 comprises an opening 66 through which water trickles downwardly after leaving the water distribution means 38. Each plate 62 also includes side flanges 68 adapted to be joined to a similar side flange 68 of an adjacent plate 62 to form a first set of vertically extending channels 78 through which the water proceeds downwardly and through which a first stream of air can proceed upwardly. Each sheet can include one or more vertically extending depressions 70 for rigidifying the plate 62, and can also include periodic horizontally extending depressions 72 to assure the proper spacing between adjacent plates 62.

Each of the plates also includes a plurality of horizontally extending capillary fins 74 having slot-like depressions which are dimensioned to exhibit capillarity. That is, the generally horizontal slots within the capillary fins 74 have a sufficiently small vertical interior dimension A that water traveling downward through channels 70 is drawn into and caused to substantially fill the slot by capillary action. As shown in FIG. 5, the depth of the capillary fins 74 are chosen to be substantially identical to the horizontally extending reinforcing depressions 72. Further, the capillary fins 74 are spaced from each other by a distance D which, in one embodiment, is approximately equal to the separation distance C between the major surfaces 76 forming channel 70. Thus, each plate 62 can be seen to include major surfaces 76 defining the boundaries of first channels 78, which major surfaces 76 are periodically interrupted by a series of horizontally extending capillary fins 74.

In the preferred embodiment, the major surfaces 76 as well as the interior of the capillary fins 74 are treated so as to exhibit enhanced wettability. This can be easily achieved by coating one side of each plate 62 with a chopped polyester fiber flocking 58. The flocking 58 can most advantageously be applied to the plates 62 while they are in planar form prior to the formation of upper flanges 64, side flanges 68, depressions 70 and 72, and capillary fins 74. After the flocking or other wettability-enhancing material 58 is applied, the various flanges, depressions, fins, and channels can be formed by subjecting the planar sheet to a conventional thermoforming step.

The plates 62, once formed, can be assembled in pairs 80 with the wettability-enhanced, major surfaces 76 facing each other. The contacting side flanges 68 can be secured to each other to form the vertically extending channels 78. The pairs 80 of plates 62 can then be assembled together with adjacent pairs of plates and the pairs secured to each other along contacting upper flanges 64 and lower flanges 82.

As shown in FIG. 5, the space 84 between adjacent pairs of plates is divided by the capillary fins 74 into a plurality of parallel, vertically spaced, rectangular openings or conduits 86 through which the second stream of air is caused to flow for cooling the same. Each rectangular opening 86 of dimensions C by D is shown to be substantially completely surrounded by water which is maintained near the wet bulb temperature of the air moving in the vertical channel 78 by virtue of the evaporation occurring in the vertically extending channels 78.

An alternative embodiment of media 20 is shown in FIGS. 7-9 wherein media 120 includes a plurality of water-impervious plates 122, 124, 126 having aligning means 128 for aligning adjoining plates 122, 124, 126 with respect to one another and capillarly means 130 for distributing water by capillary action. Media 120 includes side edge portions 134 at each side of media 120, a top edge portion 132, and a bottom edge portion 133. Each side edge portion 134 includes a side flange such as side flanges 142, 144. Opposed side flanges 142, 144 of adjoining plates 124, 126 are joined together to form a first (wet side) channel 146 through which air and water can flow. A coating 147 similar to flocking 58 (shown in FIG. 4) is added in first channel 146 to enhance wettability.

The top edge portion 132 of plates 122, 124, 126 includes top flanges 150, 152. Opposed top flanges 150, 152 of adjoining plates 122, 124 can be joined together. Likewise, bottom flanges 156, 158 of adjoining plates 122, 124 are also joined together. The joining together of opposed top flanges 150, 152 and opposed bottom flanges 156, 158 forms a second (dry side) channel 160 through which air can pass.

An opening 154 provided at the top of first channel 146 into which water is introduced into the first channel by means such as water distribution means 38 shown in FIG. 2. An opening 159 is provided at the bottom of first channel 146 into which air is blown countercurrently to the flow of water in the first channel 146.

Capillary means 130 includes a plurality of elongated, parallel fins 166, 168, 170. Fins 166, 168, 170 of adjoining plates 122, 124, 126 are alternately spaced. Fins 166 on plate 122 extend from the plate 122 upon which they are formed into the second channel 160 substantially to adjoining plate 124. Preferably, the fins 166, 168, 170 are disposed generally parallel to the flow of air in second channel 160. It can be appreciated that fins 166, 168, 170, when viewed from first channels 146, appear as elongated depressions having a vertical interior dimension F which is small enough to permit the fins to draw water which travels down vertical channel 173 into fins 166, 168, 170 through capillary action.

The fins 166, 168, by extending into second channel 160, form a series of subchannels 174. The use of the fins 166, 168 to divide second channel 146 into subchannels 174 increases the surface area of the plates 122, 124 which is presented to the air flowing through second channel 160, thus enhancing the cooling power of media 120.

Generally, all fins 166, 168, 170 are separated from each other by distance G. To effect an alternating arrangement of fins 166 of plate 122 with fins 168 of plate 124, plates 122, 124 are disposed in a head-to-tail relation. The first fin 178 of plate 122 and the first fin 180 of plate 124 are separated from top flange 150 and bottom flange 158, respectively, by a distance H which is approximately equal to one-half G, the normal spacing between fins. The last fin 182 of plate 122 and the last fin 184 of plate 124 are separated by a distance J which is approximately equal to distance G, the normal spacing between fins. Top flanges 150, 152 and bottom flanges 156, 158 are similar, which enables the top flange of one plate (e.g., 122) to be mated to the bottom flange of an adjacent plate (e.g., 124). By the use of this alternating arrangement, all the plates of media 120 can be of the same size and shape. This obviates the need for manufacturing two different types of plates.

Aligning means 128 includes a series of major projections 194, 196, minor projections 198, 200, and dimples 202, 203. Major projection 194 is an outwardly protruding projection, and major projection 196 is an inwardly protruding projection. Major projections 194, 196 are preferably disposed on vertical channel 173. Major projections 194, 196 include projected surfaces 204 and dimpled surfaces 206. The projected surfaces 204 of major projections 194, 196 are sized and positioned to be received by the dimpled surfaces 206 of the major projections 194, 196 of an adjoining plate. Dimpled surfaces 206 likewise are sized and positioned to receive projected surfaces 204 of major projections 194 of an adjoining plate. Not all dimpled surfaces 206 are positioned to receive a projected surface 204. Likewise, not all projected surfaces 204 are positioned to receive a dimpled surface 206. Generally, the projected surfaces 204 and dimpled surfaces 206 engage in the first channels 146 of media 120. Thus, plate pairs such as plates 124, 126 which are joined along their side edge portions 134 are aligned by major projections 194, 196.

Plates 122, 124, 126 include outwardly disposed minor projections 198 which are sized and positioned to be received by inwardly concaved dimples 202. Inwardly projecting minor projections 200 are sized and positioned to be received by outwardly concaved dimples 203. Engagement between minor projections 198, 200, and dimples 202, 203 takes place in second channel 160 to align pairs of plates such as plates 122, 124 which are joined along their top edge portions 132 and bottom edge portions 133. The minor projections 198, 200 can be molded into the capillary fins 208 of the plates. The dimples 202, 203 in order to be positioned to receive minor projections 198, 200 are molded into the space between fins 208.

It will be appreciated by those skilled in the art that the use of capillary channels to achieve an even distribution of a film of water on the surface of the media can be advantageous in direct contact evaporative coolers as well as in the indirect coolers described herein. The capillary channels can generally be arranged substantially as shown in FIGS. 4 and 7 so as to effect distribution of the water over the entire surface of the sheet.

An alternative embodiment of media 20 and 120 is shown in FIGS. 10-13 which comprises a combined direct and indirect media 300. The combined media 300 includes an indirect stage 302 which functions generally similarly to the indirect media structure shown in FIG. 1, wherein the air to be cooled is not directly contacted with the cooling water, and a direct stage 304 wherein the air to be cooled is directly contacted with a stream of water.

Figure 10:
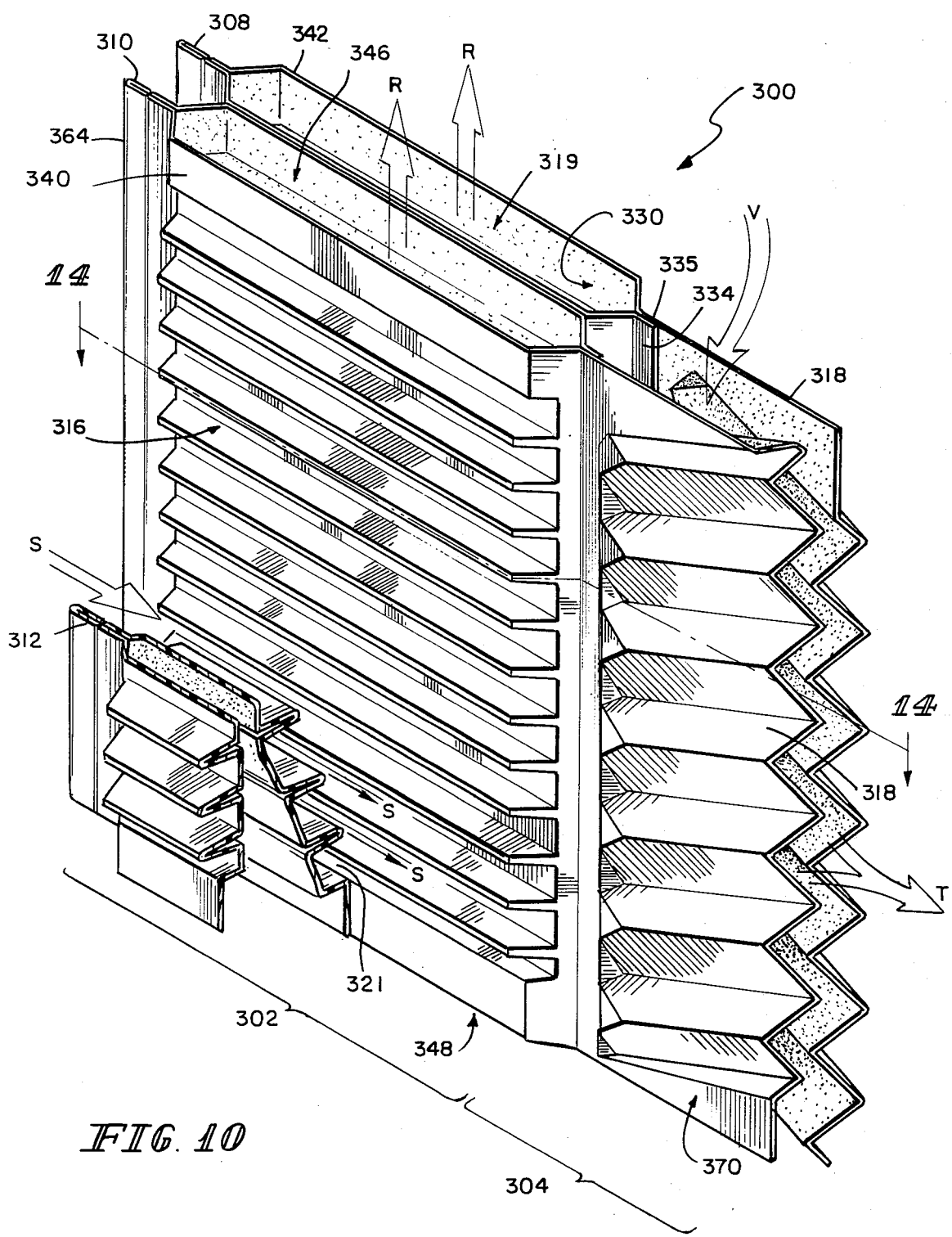
FIG. 10 is a perspective view of another embodiment of the present invention illustrating a portion of a combined direct/indirect evaporative cooling media.

The media 300 is shown in FIG. 10 as including a first plate 308, second plate 310, and a third plate 312, but will typically comprise a larger number of such plates in a side-by-side array. The plates included in any given array are similar to each other and can be identical. Each of the plates includes an indirect portion 316 and a direct portion 318. The indirect stage 302 of the media 300 is comprised of the indirect portions 316 of the plates, while the direct stage 304 is comprised of the direct portions 318. The indirect stage 302 includes a series of first (wet side) channels 319 through which air is directed upwardly, as indicated by arrows R, and through which water is directed downwardly. The indirect stage 302 also includes a series of second (dry side) channels 321 through which air to be cooled is drawn generally horizontally, as indicated by arrows S.

The indirect portion 316 also includes vertically extending end flange 334 which is formed on one side of the indirect portion 316 and a vertically extending interjoining flange 335 disposed at a second end of the indirect portion 316. The interjoining flange 335 connects the indirect portion 316 and the direct portion 318, and directs air flowing in the dry side channels of the indirect portion 316 into the direct portion 318 wherein the air contacts water which is directed downwardly therein, as indicated by arrow V. Air which emerges from the direct stage 304, as indicated by arrow T, is circulated into the space to be cooled.

The plates each include a first indirect section 322, a second indirect section 324, and a hinge portion 326 disposed between the first 322 and second 324 indirect sections, as shown in FIGS. 11 and 13. The plates 308 can be formed by stamping, thermoforming, or other techniques. When such plate is formed, the first indirect section 322 and the second indirect section 324 are side by side, and generally coplanar with each other.

Each of the first and second indirect sections 322, 324 includes a vertical array of generally horizontally extending fins 354, 356, respectively. Preferably, the fins 354, 356 are formed to extend into the dry side channels 321 of the media 300 and are thin enough to exhibit capillarity. The structure, shape, and function of the fins 354, 356 are preferably similar to that disclosed in connection with the embodiments shown in FIGS. 7-9. The fins 354 and 356 can be arranged in two possible configurations. As shown in FIG. 11, the fins 354 of the first section 322 are vertically staggered from the fins 356 of the second indirect section 324. As shown in FIG. 13, the fins 354 of the first section 322 are generally colinear with the fins 356 of the second section 324.

Each of the first and second indirect sections 322, 324 also include top flange 340 and a bottom flange 342. The top and bottom flanges 340, 342 each include an outwardly bowed portion 338. The outwardly bowed portion 338 forms a widened inlet 346 at the top of the media 300 and a widened inlet 348 at the bottom of the media 300. As explained in connection with the embodiments shown in FIGS. 1-9, the widened inlets 346, 348 provide inlets and outlets for air and water to enter and exit from the wet side channels 319.

Each plate includes a hinge portion 326 which is disposed between the first and second indirect sections 322, 324. The hinge portion 326 can be formed by a vertically extending crease 364 which extends from the top of the plate to the bottom of the plate. As best shown in FIG. 12, the crease 364 forms a vertical hinge axis about which the first indirect section 322 can be folded to place the wet sides 330 of the first and second indirect sections 322, 324 in an opposed relation. The identical width of the first 322 and second 324 indirect sections permits the end flange 334 to be mated to the interjoining flange 335. The mating of the end flange 334 and interjoining flange 335 forms a barrier to prevent the air and water traveling in the wet side channels 319 from entering into the direct portion 318, and thus commingling with the dry side channel air which is directed into the direct portion 318.

The unitarily formed crease 364 forms a leading edge of indirect portion 316 of the media 300 for serving as a barrier for preventing dry side air from entering into the wet side channels 319, and conversely preventing air and water in the wet sides 319 channel from commingling with the air of the dry side channels 321.

When the plates are arrayed in a media, and held together, the placement of the end flange 334 and interjoining flange 335 adjacent to each other is generally sufficient to adequately prevent commingling of the wet side air (cooling air) and dry side air (air to be cooled). Alternatively, it is possible to sonically bond or glue the end flange 334 and interjoining flange 335 to provide a more leakproof seal between the two 334, 335.

The direct portion 318 includes a generally vertical array of corrugations 370 which are angled from the horizontal. The corrugations 372 include a first (air entry) end 374 which is disposed adjacent the interjoining flange 335 and hence the indirect portion 316 and a second (air exit) end 376 adjacent the side edge of the plate 310. The corrugations 370 can be angled from horizontal, to be inclined either upwardly from their first ends 374 to their second ends 376, or alternatively to be inclined downwardly from their first ends 374 to their second ends 376. When the plates are joined to form a media, the corrugations 372 are positioned so that if the corrugations of one plate (e.g., 310) are inclined upwardly from their first ends 374 to their second ends 376, the corrugations 372 of both of the plates 308, 312 adjacent plate 310 will be inclined downwardly from their first ends 374 to their second ends 376. The configuration of the plates of the present invention permits this alternatingly inclined corrugation arrangement to be achieved while using identical plates.

In a preferred embodiment, all of the plates are formed to be identical, with their corrugations 372 all inclined upwardly, as shown in FIG. 13. To arrange the plates into a media, the top flange 340 of one plate (e.g., 310) is placed in an opposed relation to the bottom flanges 342 of adjacent plates (e.g., 308, 312). As will be appreciated, this is achieved by rotating these adjacent plates 308, 312 180° about a horizontal axis so that the plates are placed in a head-to-tail relation, similar to the preferred arrangement shown in FIGS. 4–7.

A difference in vertical height between the top flange 340 and bottom flange 342 results in the first fin 387 of each plate being placed at a distance from the top edge of the plate which is different than the distance which the last fin 389 is placed from the bottom edge of the plate. Thus, when the plates are placed in a head-to tail arrangement, the fins 356 of the second indirect section 324 of on plate will be interleaved with the fins 354 of the first indirect section 322 of the adjacent plate. When the fins are so interleaved, the dry side channel 321 will have a side profile in cross section similar to that shown in FIG. 8, insofar as the dry side channel 321 will comprise a plurality of subchannels defined by the fins 354 and 356.

In an alternative arrangement, the plates can include equally sized top and bottom flanges 340, 342 while still achieving an interleaved fin arrangement. The fins 354 of the first indirect section 322 of all plates are vertically staggered from the fins 356 of the second indirect section 324, as shown in FIG. 11. Two sets of plates are required, one having corrugations 372 which are upwardly inclined as shown in FIG. 11, another set including downwardly inclined corrugations. The two sets of plates can be interleaved in a side-by-side relation to achieve the same arrangement of fins in the indirect section, while achieving the alternately inclined corrugations in the direct sections. Other various arrangements of similar plates may be possible to achieve this same resultant structure for the media 300.

As will be appreciated, flocking can be applied to the corrugations of the direct portions of the plates to increase the wettability of the direct portions. Applicant believes that especially advantageous results can be achieved by flocking those corrugations which are inclined upwardly from their first ends 374 to their second ends 376. Through this arrangement, water can be applied more efficiently to the lower part of the direct portion adjacent the indirect portion, even when presented with substantial cross-flows of air S.

Although the invention has been described in detail with reference to the illustrated preferred embodiment, variations and modifications exist within the scope and spirit of the invention as described and as defined in the following claims.

What is claimed is:

1. A plate for use in a combined indirect and direct evaporative cooling media, the plate comprising a generally sheet-like element having an indirect portion and a direct portion longitudinally adjacent the indirect portion, the indirect portion including a first indirect section, a second indirect section, and means for forming a hinge between the first and second indirect sections to permit the first indirect section to be folded about the hinge to place a surface of the first indirect section and a surface of the second indirect section in an opposed relation to form a channel therebetween.

2. The plate of claim 1 wherein the indirect portion includes a vertical array of generally horizontally extending fins dimensioned thin enough to exhibit capillarity.

3. The plate of claim 1 wherein each of the first and second indirect sections includes a vertical array of generally horizontally extending fins, the fins of the first indirect section being vertically staggered from the fins of the second indirect section.

4. The plate of claim 1 wherein the indirect portion includes a top edge, a bottom edge, a vertical array of generally horizontally extending fins, the array of fins including a first fin adjacent the top edge and a last fin adjacent the bottom edge, the first fin being at a different distance from the top edge than the distance the last fin is from the bottom edge.

5. The plate of claim 1 wherein each of the first and second indirect sections includes a vertical array of generally horizontally extending fins, the fins of the first indirect section being coplanar with the fins of the second indirect section.

6. The plate of claim 1 wherein each of the first and second indirect sections includes an array of fins extending away from the means for forming a hinge and toward the direct portion when the first and second indirect sections are folded about the hinge.

7. The plate of claim 1 wherein the direct portion comprises a vertical array of corrugations inclined from horizontal.

8. The plate of claim 7 wherein the corrugations of the direct portion include a first end adjacent the indirect portion and a second end, the corrugations being inclined upwardly from their first ends to their second ends.

9. The plate of claim 7 wherein the corrugations of the direct portion includes a first end adjacent the indirect portion and a second end, the corrugations being inclined downwardly from their first ends to their second ends.

10. An evaporative cooling media comprising a plurality of plates, each plate being formed with a direct portion and a longitudinally adjacent indirect portion, the plates being positioned transversely adjacent to each other in an ordered array such that the direct portions are coaligned and the indirect portions are coaligned to form a combined direct and indirect evaporative cooling media.

11. The evaporative cooling media of claim 10 wherein the direct portion comprises a vertical array of corrugations inclined from horizontal.

12. The evaporative cooling media of claim 10 wherein the indirect portion of each plate comprises a first indirect section, a second indirect section, and hinge means formed between the first and second indirect sections about which the first indirect section is folded to place a surface of the first indirect section in an opposed relation to a surface of the second indirect section.

13. The evaporative cooling media of claim 12 wherein each of the first and second indirect sections includes an array of fins extending away from the hinge means and toward the direct portion.

14. An evaporative cooling media comprising a plurality of plates, each plate being formed with a direct portion and an indirect portion, the indirect portion including a first indirect section having a vertical array of generally horizontally extending fins, a second indirect section having a vertical array of generally horizontally extending fins, the fins of the first indirect section being vertically staggered from the fins of the second indirect section, and a hinge portion disposed between the first and second indirect sections, the first indirect section being folded about the hinge portion for placing the first and second indirect sections in an opposed relation, the plates being positioned adjacent to each other in an ordered array such that the direct portions are coaligned and the indirect portions are coaligned to form a combined direct and indirect evaporating cooling media.

15. An evaporative cooling media comprising a plurality of plates, each plate being formed with a direct portion and an indirect portion, the indirect portion including a top flange section, a bottom flange section having a vertical height different than the top flange section, first and second indirect sections having a vertical array of generally horizontally extending fins, the fins of the first indirect section being coplanar with the fins of the second indirect section, and a hinge portion disposed between the first and second indirect sections, the first indirect section being folded about the hinge portion for placing the first and second indirect sections in an opposed relation, the plates being positioned adjacent to each other in an ordered array such that the direct portions are coaligned and the indirect portions are coaligned to form a combined direct and indirect evaporative cooling media.

16. A combined direct and indirect evaporative cooling media comprising first and second plates, the first and second plates including a direct portion having a vertical array of corrugations inclined from horizontal, an indirect portion having a vertical array of generally horizontally extending fins, a top flange portion, and a bottom flange portion having a vertical height different than the top flange portion, the plates being arrayed to form the media such that the top flange portion of the first plate is in an opposed relation to the bottom flange portion of the second plate.

17. The combined media of claim 16 wherein the first and second plates are identical.

18. The combined media of claim 16 wherein the top and bottom flanges are sized to permit interleaving of the horizontally extending fins of the indirect portions of the first and second plates.

19. A combined direct and indirect evaporative cooling media comprising first and second plates, the first and second plates including an indirect portion and a direct portion, the direct portion including a vertical array of corrugations having a first end adjacent the indirect portion and a second end adjacent an end of the plate, the corrugations of the first plate being inclined upwardly from their first ends to their second ends, and the corrugations of the second plate being inclined downwardly from their first ends to their second ends.

20. The combined media of claim 19 wherein the indirect portions of the first and second plates comprise a first indirect section and a second indirect section, each of the first and second sections including a vertical array of generally horizontally extending fins, the fins of the first indirect section being vertically staggered from the fins of the second indirect section for permitting the fins of the first indirect section of the first plate to interleave with the fins of the second indirect section of the second plate.

21. The combined media of claim 20 wherein the indirect portion of each plate includes a hinge portion disposed between the first and second indirect sections, the first indirect section being folded about the hinge portion for placing the first and second indirect sections in an opposed relation.

22. An evaporative cooling media comprising a plurality of plates, each plate being formed with a direct portion and a longitudinally adjacent indirect portion, the indirect portion including a first indirect section having a vertical array of generally horizontally extending fins, a second indirect section having a vertical array of generally horizontally extending fins, and a hinge portion disposed between and unitary with the first and second indirect sections, the first indirect section being folded about the hinge portion to place the first and second indirect sections in an opposed relation to form a channel therebetween, the fins extending outwardly from the channel.

23. The evaporative cooling media of claim 22 wherein the hinge portion forms a leading edge for air flowing between adjacent plates.

* * * * *